(12) United States Patent
Nabeshima

(10) Patent No.: US 8,996,275 B2
(45) Date of Patent: Mar. 31, 2015

(54) CONTROL DEVICE FOR VEHICLE

(71) Applicant: Fuji Jukogyo Kabushiki Kaisha, Tokyo (JP)

(72) Inventor: Akihiro Nabeshima, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/224,774

(22) Filed: Mar. 25, 2014

(65) Prior Publication Data

US 2014/0297151 A1  Oct. 2, 2014

(30) Foreign Application Priority Data

Mar. 28, 2013  (JP) ................................ 2013-070292

(51) Int. Cl.

| | |
|---|---|
| B60W 30/16 | (2012.01) |
| B60W 50/14 | (2012.01) |
| B60K 31/00 | (2006.01) |
| G08G 1/16 | (2006.01) |
| B60W 30/165 | (2012.01) |
| B60K 6/48 | (2007.10) |

(52) U.S. Cl.
CPC ............ *B60K 31/00* (2013.01); *Y02T 10/6221* (2013.01); *Y02T 10/6286* (2013.01); *B60W 30/165* (2013.01); *B60K 2006/4808* (2013.01); *B60K 2031/0025* (2013.01); *B60K 2310/30* (2013.01); *B60W 2540/12* (2013.01); *B60W 2710/0666* (2013.01); *B60W 2710/105* (2013.01); *B60W 2750/308* (2013.01); *B60K 2310/266* (2013.01)
USPC .......................................................... 701/96

(58) Field of Classification Search
CPC .......... B60W 30/16; B60W 2550/308; B60W 2550/302; B60W 2750/308; B60W 2550/306; B60W 30/162; B60W 2050/008; B60W 2540/10; B60W 2550/30; B60W 2050/0095; B60W 2510/081; B60W 2520/28; B60W 50/087; B60W 50/10; B60K 2310/26; B60K 2350/1084; G01S 2013/935; B60Q 2300/41; B60Q 9/008

See application file for complete search history.

(56) References Cited

U.S. PATENT DOCUMENTS

| | | | | |
|---|---|---|---|---|
| 8,825,339 B2 * | 9/2014 | Shono et al. | ..................... | 701/93 |
| 2002/0169538 A1 * | 11/2002 | Yamamura et al. | ............. | 701/96 |
| 2003/0028311 A1 * | 2/2003 | Seto et al. | ........................ | 701/96 |
| 2006/0155469 A1 * | 7/2006 | Kawasaki | ..................... | 701/301 |

(Continued)

FOREIGN PATENT DOCUMENTS

| | | |
|---|---|---|
| JP | 2008-045637 A | 2/2008 |
| JP | 2009-126308 A | 6/2009 |

*Primary Examiner* — James Trammell
*Assistant Examiner* — Demetra Smith-Stewart
(74) *Attorney, Agent, or Firm* — McDermott Will & Emery LLP

(57) ABSTRACT

A first travel controller of a control device for a vehicle sets a first target drive force based on preceding vehicle information to control a power source when a follow-up system is in an active state. A second travel controller sets a second target drive force based on a driver's operation to control the power source when the follow-up system is in an inactive state. A third travel controller sets a third target drive force that changes from the first target drive force toward to the second target drive force to control the power source when the follow-up system is switched from the active state to the inactive state. The third travel controller makes a difference between a change rate of the third target drive force set after the cancel operation and a change rate of the third target drive force set after the brake operation.

8 Claims, 6 Drawing Sheets

(56) References Cited

U.S. PATENT DOCUMENTS

| | | | |
|---|---|---|---|
| 2007/0213915 A1* | 9/2007 | Tange et al. | 701/96 |
| 2007/0213916 A1* | 9/2007 | Sugano et al. | 701/96 |
| 2007/0255481 A1* | 11/2007 | Egawa et al. | 701/96 |
| 2009/0132125 A1* | 5/2009 | Yonezawa et al. | 701/41 |
| 2010/0121549 A1* | 5/2010 | Fukuda et al. | 701/93 |
| 2011/0004387 A1* | 1/2011 | Sugano et al. | 701/96 |
| 2013/0211686 A1* | 8/2013 | Shono et al. | 701/70 |
| 2013/0289814 A1* | 10/2013 | Tanaka et al. | 701/22 |

* cited by examiner

CONTROL DEVICE FOR VEHICLE

CROSS-REFERENCE TO RELATED APPLICATIONS

The present application claims priority from Japanese Patent Application No. 2013-070292 filed on Mar. 28, 2013, the entire contents of which are hereby incorporated by reference.

BACKGROUND

1. Technical Field

The present invention relates to a vehicle control device having a follow-up system to have the vehicle to travel as following a preceding vehicle.

2. Related Art

Recently, there has been proposed, as a driving support device, a device having a cruise control system which is a follow-up system to control a vehicle to recognize a preceding vehicle using a millimeter-wave radar, an infrared laser radar, a stereo camera, a monocular camera or the like and automatically follow the preceding vehicle. This type of cruise control system can be switched between an active state and an inactive state according to a switch operation by a driver. Further, there has been proposed a control device that switches the cruise control system to the inactive state when a brake pedal is pressed by the driver even if the driver does not perform the switch operation (see Japanese Unexamined Patent Application Publication (JP-A) No. 2008-45637 and JP-A No. 2009-126308).

When the cruise control system is active, target drive force is set based on an inter-vehicle distance from a preceding vehicle. On the other hand, when the cruise control system is inactive, target drive force is set based on a pressing amount of the accelerator pedal and the like. In other words, different values of target drive force are set when the cruise control system is in the active state and the inactive state and it is thus required to switch the target drive force of the vehicle when the driver stops the cruise control system by operating the switch, the brake and the like. However, travel conditions of the vehicle may be significantly different between the case in which the cruise control system is stepped by driver's switch operation and the case in which the cruise control system is stopped by driver's brake operation. Thus, if the target drive force is switched in the same manner both when the cruise control system is stopped by switch operation and brake operation, the driver may feel discomfort.

SUMMARY OF THE INVENTION

The present invention has an object to stop a follow-up system while suppressing driver's discomfort.

An aspect of the present invention provides a control device for a vehicle with a follow-up system to have the vehicle to travel as following a preceding vehicle, the vehicle control device including: a power source to transfer power to a drive wheel; a system stopper to switch the follow-up system from an active state to an inactive state based on a cancel operation and a brake operation by a driver; a first travel controller to set a first target drive force based on preceding vehicle information and control the power source based on the first target drive force when the follow-up system is in the active state; a second travel controller to set a second target drive force based on a driver's operation and control the power source based on the second target drive force when the follow-up system is in the inactive state; and a third travel controller to set a third target drive force that changes from the first target drive force to the second target drive force and control the power source based on the third target drive force when the follow-up system is switched from the active state to the inactive state. The third travel controller makes difference between a change rate of the third target drive force which is set after the cancel operation and a change rate of the third target drive force which is set after the brake operation.

DETAILED DESCRIPTION

Figure 1:
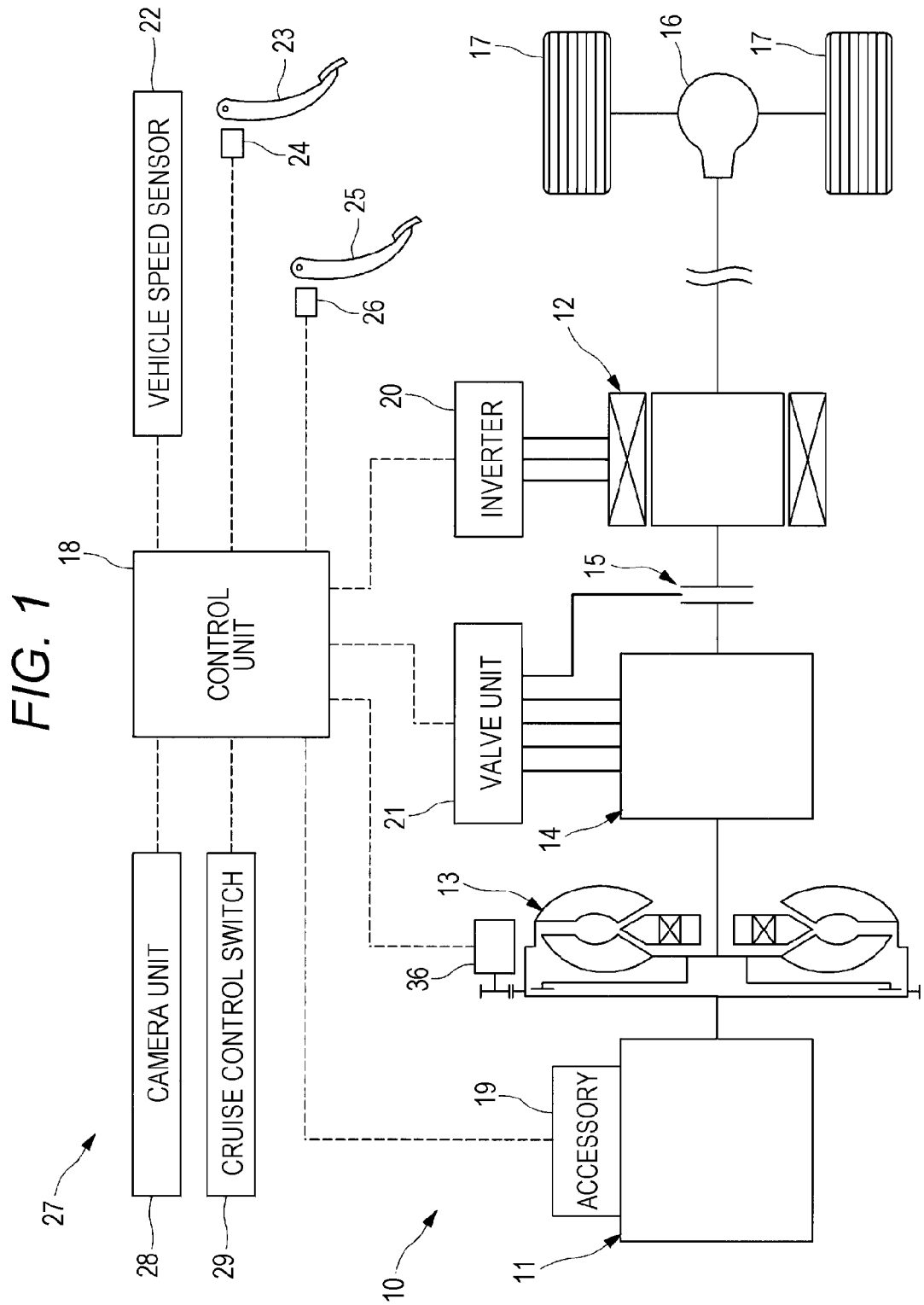
FIG. 1 is a schematic diagram illustrating an example of a power unit mounted in a vehicle.

An example of the present invention will be described in detail below with reference to the drawings. FIG. 1 is a schematic diagram illustrating an example of a power unit 10 mounted in a vehicle. The power unit 10 is controlled by a control device for a vehicle according to the example of the present invention. As illustrated in FIG. 1, the power unit 10 includes an engine 11 and a motor-generator 12. A torque converter 13 and a transmission 14 are provided between the engine 11 and the motor-generator 12. Further, a clutch 15 is provided between the transmission 14 and the motor-generator 12. Drive wheels 17 are connected to the motor-generator 12 via a differential mechanism 16.

By releasing the clutch 15 disposed between the transmission 14 and the motor-generator 12, the engine 11 can be separated from the drive wheels 17, whereby only power of the motor-generator 12 can be transferred to the drive wheels 17. On the other hand, by engaging the clutch 15, the engine 11 can be connected to the drive wheels 17, whereby power of the engine 11 and the motor-generator 12 can be transferred to the drive wheels 17. The power unit 10 illustrated in the drawing is a power unit mounted in a hybrid vehicle, but the vehicle to which the present invention is applied is not limited to a hybrid vehicle. For example, the present invention may be applied to a vehicle having only the engine 11 as a drive source, and the present invention may be applied to an electric vehicle having only the motor-generator 12 as a drive source.

As illustrated in FIG. 1, the hybrid vehicle is provided with a control unit 18 to control the engine 11, the motor-generator 12, the transmission 14, the clutch 15 and the like which constitute the power unit 10. The control unit 18 is connected to accessories 19 such as a throttle valve and an injector which control the engine 11, and the engine torque, engine speed and the like are controlled according to a control signal from the control unit 18. The control unit 18 is connected to an inverter 20, which is connected to the motor-generator 12, and motor torque, motor speed and the like are controlled according to a control signal from the control unit 18. Further, the control unit 18 is connected to a valve unit 21 which supplies operating oil to the transmission 14 and the clutch 15, and operating conditions of the transmission 14 and the clutch 15 are controlled according to a control signal from the control unit 18. Further, a vehicle speed sensor 22 that detects a travel speed of the vehicle, which is a vehicle speed, an accelerator pedal sensor 24 for detecting a manipulated variable of an accelerator pedal 23, a brake pedal sensor 26 for detecting a manipulated variable of a brake pedal 25, and the like are connected to the control unit 18. The control unit 18 is composed of a CPU that calculates a control signal and the like, a ROM that stores a control program, a computing equation, chart data and the like, and a RAM that temporary stores data, for example.

The hybrid vehicle also has a cruise control system (hereinafter, referred to as a cruise system) 27 as a follow-up system with a follow-up function to travel as following a preceding vehicle. The cruise system 27 includes a camera unit 28 that captures an image in front of the vehicle and a cruise control switch (hereinafter, referred to as a cruise switch) 29 which is operated by a driver. The cruise system 27 can be switched to an active state and an inactive state through the operation of the cruise switch 29. Further, an inter-vehicle distance, a vehicle speed and the like can be set to follow a preceding vehicle through the operation of the cruise switch 29.

When the cruise system 27 is activated, the control unit 18 determines the information on a preceding vehicle traveling ahead (preceding vehicle information) based on image information from the camera unit 28. The preceding vehicle information may be whether a preceding vehicle exists, an inter-vehicle distance from the preceding vehicle, a difference in speed from the speed of the preceding vehicle, and the like. Then, the control unit 18 controls the drive of the engine 11 and the motor-generator 12 so as to maintain the inter-vehicle distance set by the driver as traveling within a range of the vehicle speed set by the driver. In this manner, the control unit 18, the camera unit 28, the cruise switch 29 and the like constitute the cruise system 27 which performs the follow-up function. A turn-off operation of the cruise switch 29 can switch the cruise system 27 to the inactive state. When the cruise system 27 is stopped, the control unit 18 controls the drive of the engine 11 and the motor-generator 12 based on the accelerator manipulated variable, the brake manipulated variable, and the vehicle speed.

Figure 2:
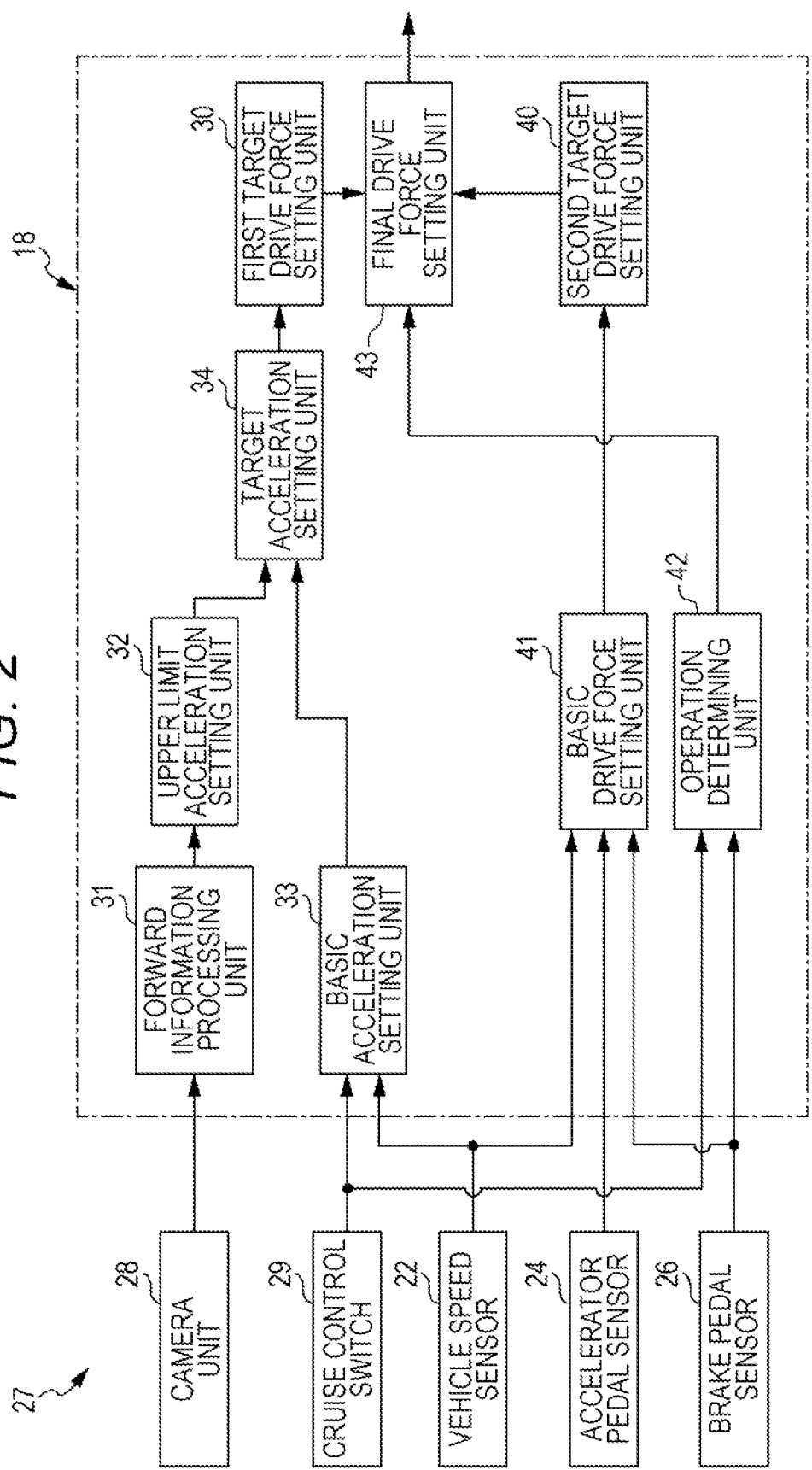
FIG. 2 is a block diagram illustrating a part of a control function installed in a control unit.

Hereinafter, a travel control of the hybrid vehicle executed by the control unit 18 will be described. As described below, the control unit 18 functions as the system stopper, the first travel controller, the second travel controller, and the third travel controller. FIG. 2 is a block diagram illustrating a part of those control functions installed in the control unit 18. As illustrated in FIG. 2, the control unit 18 is provided with a first target drive force setting unit 30 for setting a first target drive force. The first target drive force is based on the preceding vehicle information, and used set for the drive wheels 17 when the cruise system 27 is active. Further, the control unit 18 is provided with a second target drive force setting unit 40 for setting a second target drive force. The second target drive force is set according to driver's operation and used for drive wheels 17 when the cruise system 27 is inactive.

As illustrated in FIG. 2, in order to set a first target drive force which is used when the cruise system 27 is active, the control unit 18 is provided with a forward information processing unit 31, an upper limit acceleration setting unit 32, a basic acceleration setting unit 33, and a target acceleration setting unit 34. The forward information processing unit 31 examines the preceding vehicle information such as whether a preceding vehicle exists, an inter-vehicle distance from the preceding vehicle, a difference in speed from the speed of the preceding vehicle and the like based on the image information from the camera unit 28. The upper limit acceleration setting unit 32 sets an upper limit acceleration of vehicle based on the inter-vehicle distance or the speed difference from the forward information processing unit 31. The basic acceleration setting unit 33 uses the vehicle speed set by operation on the cruise switch 29 and the current vehicle speed input by the vehicle speed sensor 22 to set a basic acceleration for controlling the vehicle to travel in the set vehicle speed. Further, the target acceleration setting unit 34 compares the upper limit acceleration and the basic acceleration, and sets either of them, whichever is higher, as a target acceleration. Then, the first target drive force setting unit 30 sets the first target drive force based on the target acceleration. Thus, the first target drive force which is used when the cruise system 27 is active is the target drive force which is set based on the preceding vehicle information. Here, the first target drive force is set when the cruise system 27 is in the inactive state as well as when the cruise system 27 is in the active state.

As illustrated in FIG. 2, the control unit 18 is provided with a basic drive force setting unit 41 to set a second target drive force which is used when the cruise system 27 is inactive. The basic drive force setting unit 41 sets a basic drive force of the drive wheels 17 by referring to a predetermined drive force chart, based on the vehicle speed, the accelerator manipulated variable, the brake manipulated variable, and the like. Then, the second target drive force setting unit 40 performs a predetermined filtering process to the basic drive force and sets a second target drive force. Thus, the second target drive force which is used when the cruise system 27 is inactive is the target drive force which is set based on an accelerator operation or a brake operation, which are driver's operations. Here, the second target drive force is set when the cruise system 27 is in the active state, as well as when the cruise system 27 is in the inactive state.

As illustrated in FIG. 2, in order to set a final target drive force based on the first target drive force and the second target drive force, the control unit 18 is provided with an operation determining unit 42 and a final drive force setting unit 43. The operation conditions of the cruise switch 29 and the brake pedal 25 are input to the operation judgment unit 42. The operation determining unit 42 judges whether the cruise system 27 is in the active state based on the operation conditions of the cruise switch 29 and the brake pedal 25 and transmits the determination result to the final drive force setting unit 43. For example, when the cruise switch 29 is in a turned-on state and the brake pedal 25 is not pressed, the operation determining unit 42 determines that the cruise system 27 is in the active state. Then, the final drive force setting unit 43 which receives the determination result determining the active state sets the first target drive force as a final target drive force and outputs a control signal to the engine 11, the motor-generator 12 and the like. On the other hand, when the cruise switch 29 is in a turned-off state or when the brake pedal 25 is being pressed, the operation determining unit 42 determines that the cruise system 27 is in the inactive state. Then, the final drive force setting unit 43 which receives the determination result determining the inactive state sets the second target drive force as a final target drive force and outputs a control signal to the engine 11, the motor-generator 12, and the like.

Further, when a most recent determination result was that the cruise system 27 was in the active state and a current determination result is that the cruise system 27 is in the inactive state, the final drive force setting unit 43 sets a third target drive force that changes from the first target drive force toward the second target drive force as a final target drive force. In other words, when the cruise switch 29 is operated from a turned-on state to a turned-off state (a cancel operation) or when the brake pedal 25 is operated from a released state to a pressed state (a brake operation), the final drive force setting unit 43 outputs a control signal to the engine 11, the motor-generator 12 and the like based on the third target drive force set as the final target drive force. In this manner, when switching the cruise system 27 from the active state to the inactive state, the third target drive force connecting the first target drive force and the second target drive force is set in order to smoothly change the final target drive force from the first target drive force to the second target drive force.

Figure 3:
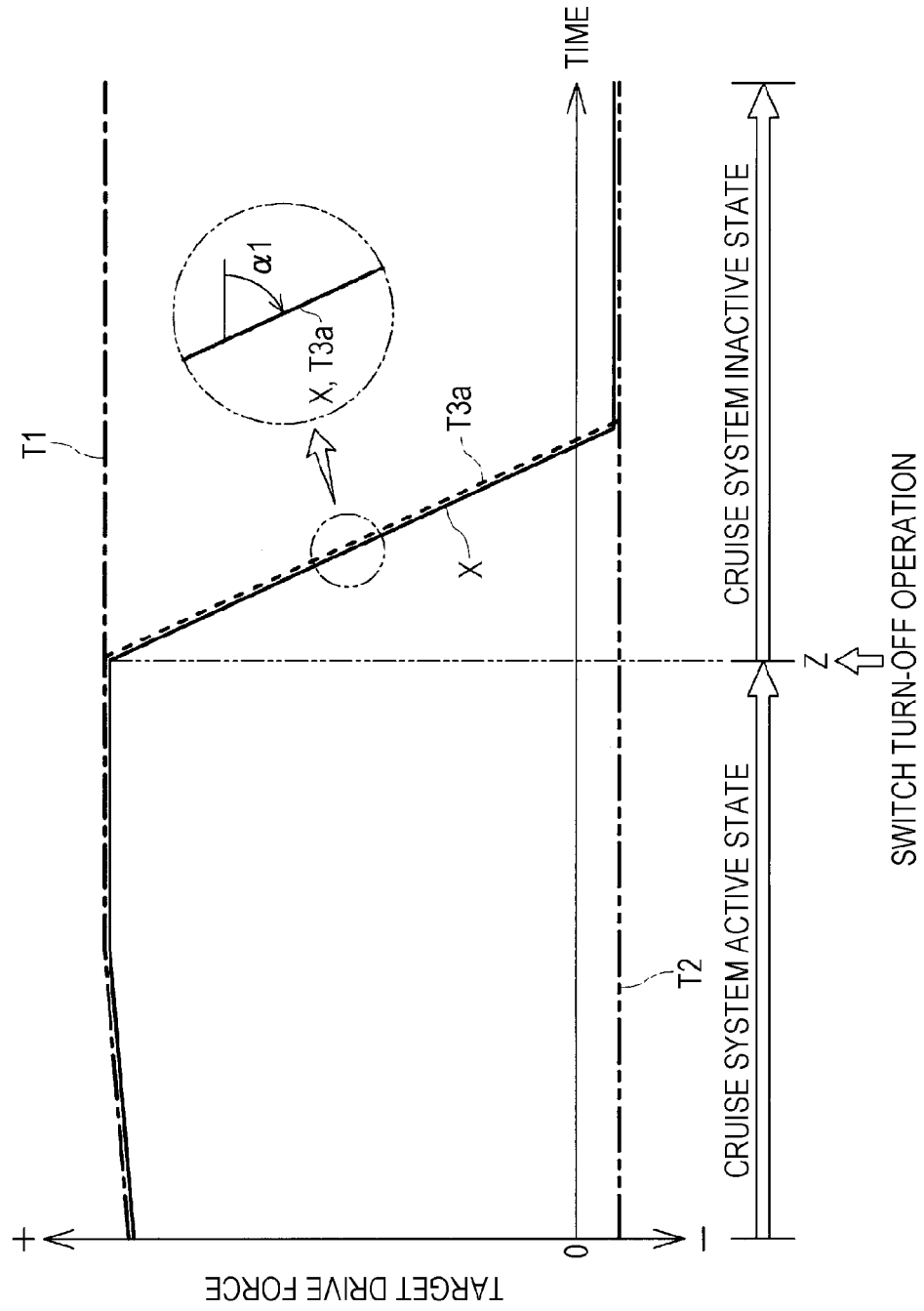
FIG. 3 is an diagram illustrating an example of a set condition of a final target drive force.
Figure 4:
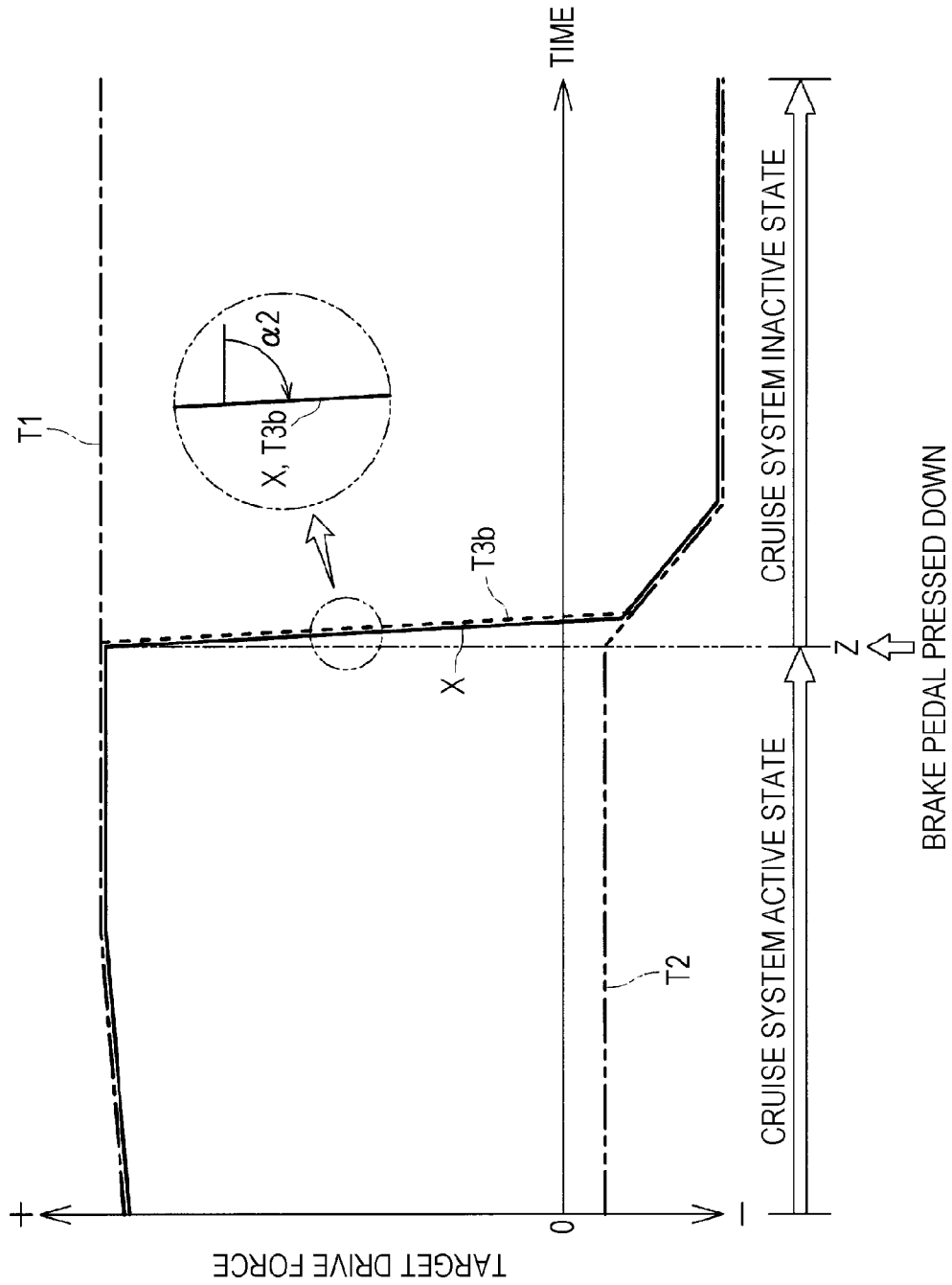
FIG. 4 is an diagram illustrating an example of a set condition of the final target drive force.

FIGS. 3 and 4 illustrate examples of set conditions of a final target drive force X. FIG. 3 illustrates a condition when the cruise system 27 is stopped by a cancel operation, and FIG. 4 illustrates a condition when the cruise system 27 is stopped by a brake operation. Further, in FIGS. 3 and 4, the dashed-dotted lines represent first target drive forces T1, the dashed-two dotted lines represent second target drive forces T2, the dashed lines represent third target drive forces T3a and T3b, and the solid lines represents a final target drive forces X. Further, FIGS. 3 and 4 illustrate active states of the cruise system 27 in the same travel condition. In FIGS. 3 and 4, for easy understanding, the final target drive forces X partially overlapping on the respective target drive forces T1, T2, T3a, and T3b are illustrated as to be shifted from the respective target drive forces T1, T2, T3a, and T3b.

As illustrated in FIG. 3, when the cruise system 27 is in the active state, the first target drive force T1 and the second target drive force T2 are set in parallel, and the first target drive force T1 based on the preceding vehicle information is set as the final target drive force X. When the cruise system 27 is in the active state, the accelerator pedal 23 is being released, and thus the second target drive force T2 based on drive operations is set negative, in other words, on the braking torque side. Further, as indicated by the reference Z in FIG. 3, when a turn-off operation, which is a cancel operation, is performed on the cruise switch 29 to switch the cruise system 27 from the active state to the inactive state, the third target drive force T3a connecting between the first target drive force T1 and the second target drive force T2 is set. Then, the final target drive force X reduces along the third target drive force T3a until the final target drive force X reaches to the second target drive force T2 from the first target drive force T1. In this case, a change rate, that is, an inclination, of the third target drive force T3a is α1.

On the other hand, as indicated by the reference Z in FIG. 4, when the cruise system 27 is active and the pressing operation is performed as the brake operation on the brake pedal 25 to switch the cruise system 27 from the active state to the inactive state, the third target drive force T3b connecting between the first target drive force T1 and the second target drive force T2 is set. Then, the final target drive force X reduces along the third target drive force T3b until the final target drive force X reaches to the second target drive force T2 from the first target drive force T1. In this case, a change rate, that is, an inclination α2 of the third target drive force T3b is greater than the inclination α1 of the third target drive force T3a in FIG. 3. In other words, the change rate of the third target drive force T3a set after the cancel operation and the change rate of the third target drive force T3b set after the brake operation are different. Note that when the cruise system 27 is stopped by the brake operation, the second target drive force T2 is increased in the negative direction according to the manipulated variable of the brake pedal 25.

As described above with FIG. 3, when the cruise system 27 is stopped by driver's cancel operation under the condition that the first target drive force T1 is greater than the second target drive force T2, the change rate of the third target drive force T3a is set smaller. In this manner, when the cruise system 27 is stopped by a cancel operation, drive force is gradually changed from the first target drive force T1 to the second target drive force T2. When the cruise system 27 is stopped by a cancel operation, the driver does not request active acceleration or deceleration, and thus deceleration shock and the like is suppressed by gradually changing the final target drive force X. This enables to stop the cruise system 27 as suppressing driver's discomfort.

On the other hand, as illustrated in FIG. 4, when the cruise system 27 is stopped by the driver's brake operation under the condition that the first target drive force T1 is greater than the second target drive force T2, the change rate of the third target drive force T3b is set greater compared to the above described case of FIG. 3. In this manner, when the cruise system 27 is stopped by the brake operation, the drive force is promptly changed from the first target drive force T1 to the second target drive force T2. When the cruise system 27 is stopped by the brake operation, requests aggressive deceleration, and thus the final target drive force X is required to be promptly reduced to the second target drive force T2. Thus, a feeling that the vehicle is pushed out due to the final target drive force X can be suppressed by promptly reducing the final target drive force X and this enables to stop the cruise system 27 as suppressing driver's discomfort.

Figure 5:
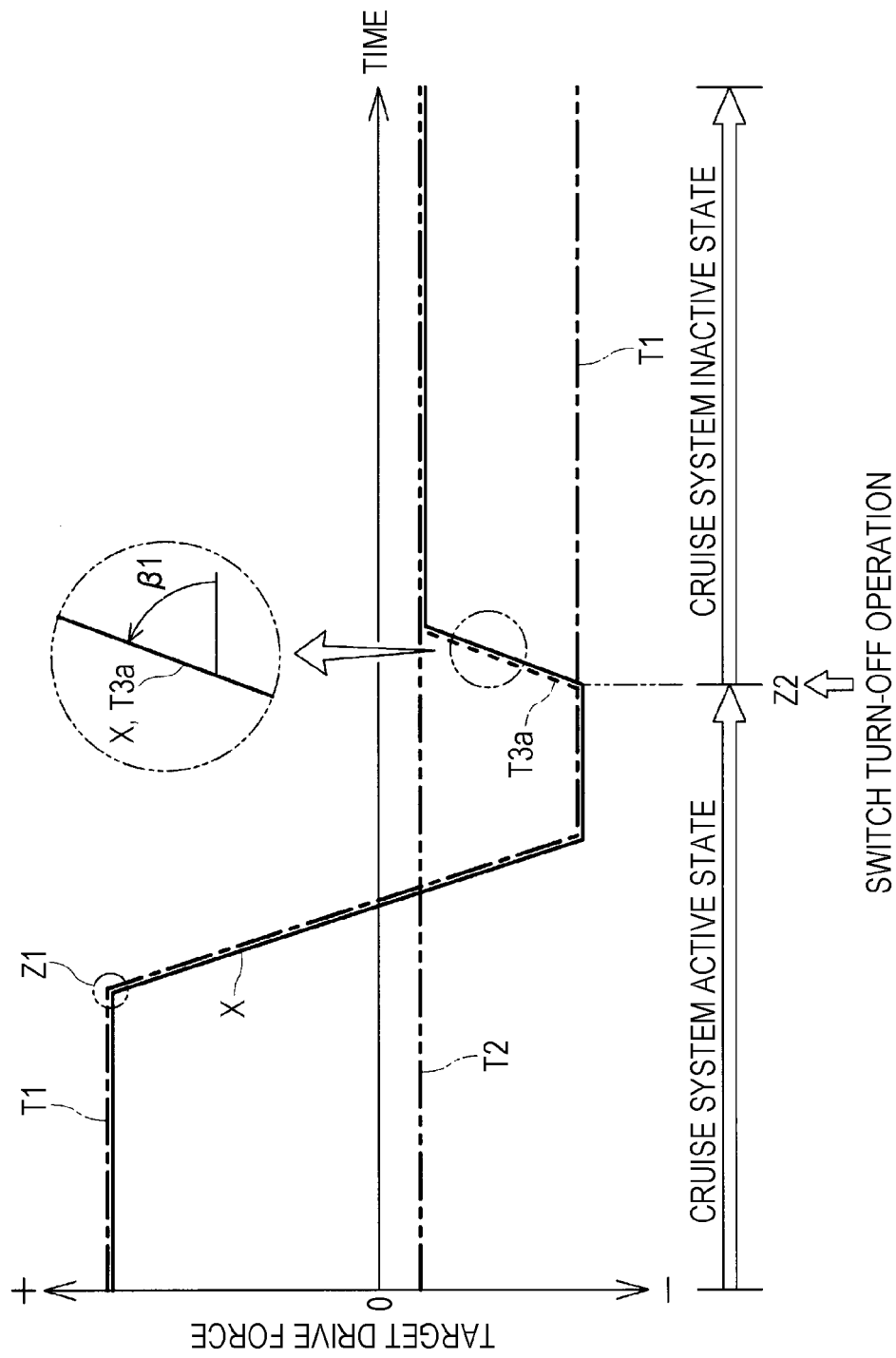
FIG. 5 is an diagram illustrating an example of a set condition of the final target drive force.
Figure 6:
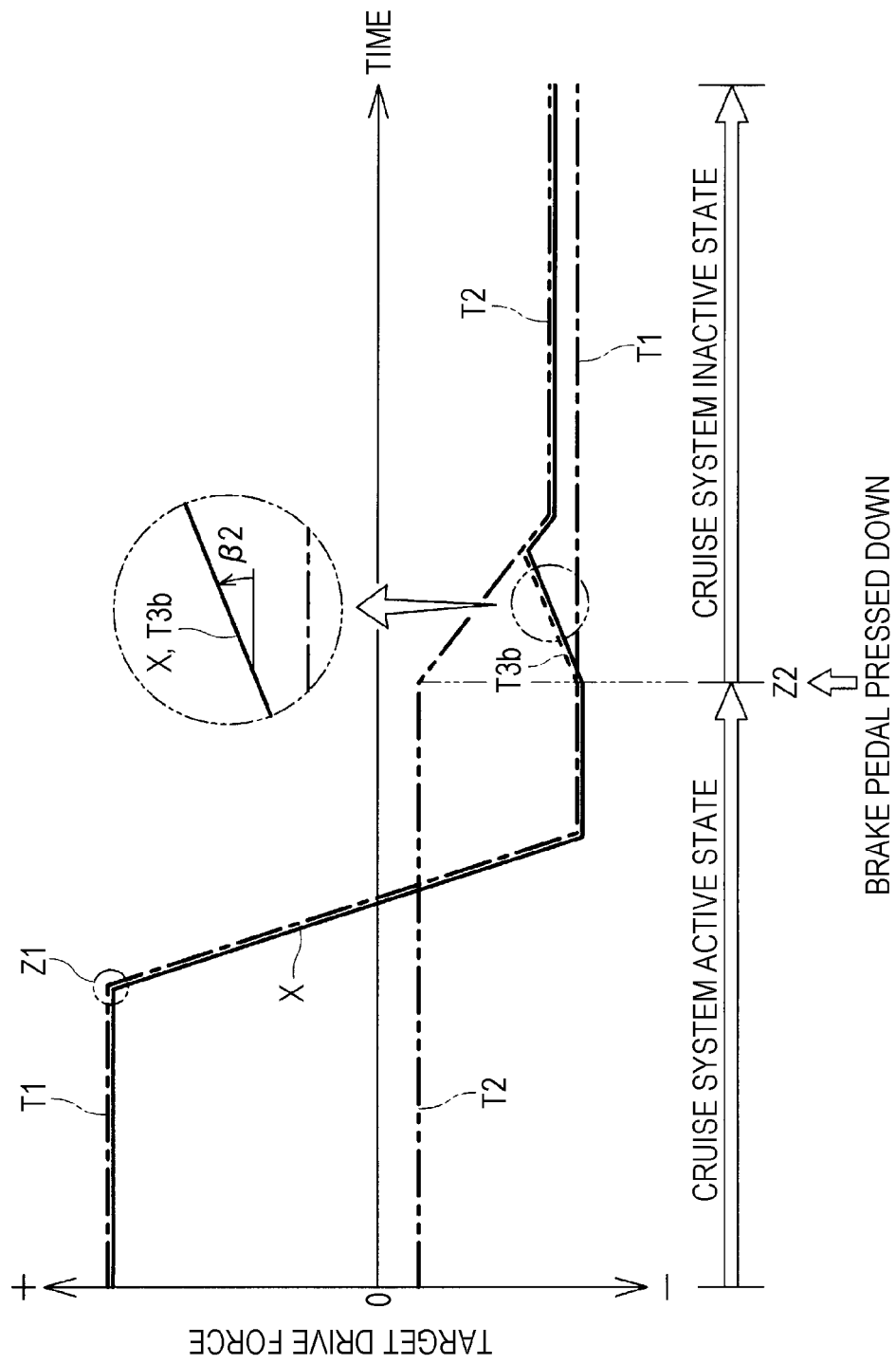
FIG. 6 is a diagram illustrating an example of a set condition of the final target drive force.

Under the condition illustrated in FIGS. 3 and 4, the first target drive force T1 is greater than the second target drive force T2. However, the present invention can also be effectively applied in a condition that the first target drive force T1 is smaller than the second target drive force T2. FIGS. 5 and 6 illustrate examples of set conditions of the final target drive force X. FIG. 5 illustrates a condition when the cruise system 27 is stopped by a cancel operation; and FIG. 6 illustrates a condition when the cruise system 27 is stopped by a brake operation. Similarly to FIGS. 3 and 4, in FIGS. 5 and 6, the dashed-dotted lines represent the first target drive forces T1, the dashed-two dotted lines represent the second target drive forces T2, the dashed lines represent the third target drive forces T3a and T3b, and the solid lines represent the final target drive forces X. Further, FIGS. 5 and 6 illustrate active states of the cruise system 27 in the same travel condition. Further, in FIGS. 5 and 6, for easy understanding, the final target drive forces X partially overlapping on the respective target drive forces T1, T2, T3a, and T3b are illustrated to be slightly shifted from the respective target drive forces T1, T2, T3a, and T3b.

As illustrated in FIG. 5, when the cruise system 27 is in the active state, the first target drive force T1 and the second target drive force T2 are set in parallel, and the first target drive force T1 based on the preceding vehicle information is set as the final target drive force X. When the cruise system 27 is in the active state, the accelerator pedal 23 is being released, and thus the second target drive force T2 based on drive operation is set negative, in other words, on the braking torque side. Further, as indicated by the reference Z1 in FIG. 5, when the cruise system 27 executes a deceleration control due to an approach to the preceding vehicle, the first target drive force T1 is set smaller than the second target drive force T2. In other words, under the travel condition illustrated in FIG. 5 the first target drive force T1 is lower than the second target drive force T2. Subsequently, as indicated by the reference Z2 in FIG. 5, when a turn-off operation, which is a cancel operation, is operated on the cruise switch 29 to switch the cruise system 27 from the active state to the inactive state, the third target drive force T3a connecting the first target drive force T1 and the second target drive force T2 is set. Then the final target drive force X increases along the third target drive force T3a until the final target drive force X reaches to the second target drive force T2 from the first target drive force T1. In this case, a change rate, that is, an inclination, of the third target drive force T3a is β1.

On the other hand, as indicated by the reference Z2 in FIG. 6, when the cruise system 27 is active and a press-down operation is performed as the brake operation on the brake pedal 25 to switch the cruise system 27 from the active state to the inactive state, a third target drive force T3b connecting the first target drive force T1 and the second target drive force T2 is set. Then, the final target drive force X increases along the third target drive force T3b until the final target drive force X reaches to the second target drive force T2 from the first target drive force T1. In this case, a change rate, that is, an inclination β2 of the third target drive force T3b is smaller than the inclination β1 of the third target drive force T3a illustrated in FIG. 5. In other words, the change rate of the third target drive force T3a set after the cancel operation and the change rate of the third target drive force T3b set after the brake operation are different. Note that when the cruise system 27 is stopped by the brake operation, the second target drive force T2 increases in the negative direction according to the manipulated variable of the brake pedal 25.

As described with FIG. 5, when the cruise system 27 is stopped by driver's cancel operation under the condition that the first target drive force T1 is smaller than the second target drive force T2, the change rate of the third target drive force T3a is set larger. In this manner, when the cruise system 27 is stopped by a cancel operation, drive force is promptly increased from the first target drive force T1 to the second target drive force T2. When the cruise system 27 is stopped by the cancel operation, it is assumed that the vehicle will be then accelerated by a accelerator operation, a response delay during the accelerating travel can be suppressed by promptly increasing the final target drive force X. This enables to stop the cruise system 27 as suppressing driver's discomfort.

On the other hand, as illustrated in FIG. 6, when the cruise system 27 is stopped by driver's brake operation under the condition that the first target drive force T1 is smaller than the second target drive force T2, the change rate of the third target drive force T3b is set smaller than the case illustrated in FIG. 5. When the cruise system 27 is stopped by the brake operation in this manner, the drive force is gradually changed from the first target drive force T1 to the second target drive force T2. When the cruise system 27 is stopped by the brake operation, the driver requests an active deceleration. Thus, A prompt increase in the final target drive force X toward the second target drive force T2 in a process of decelerating according to the brake operation may cause an unnecessary increase in the final target drive force X. On the other hand, by gradually increasing the final target drive force X, an unnecessary increase in the final target drive force X can be prevented and a feeling that the vehicle is pushed out can be suppressed. This enables to stop the cruise system 27 as suppressing driver's discomfort.

In FIGS. 3 and 4, the first target drive force T1 is greater than the second target drive force T2 such that the first target drive force T1 is set as positive values, which are values on an acceleration torque side during forward traveling, and the second target drive force T2 is set as negative values, which are values on a deceleration torque side during forward traveling. However, the present invention is not limited to these examples. For instance, both of the first target drive force T1 and the second target drive force T2 may be set as positive values such that the first target drive force T1 is greater than the second target drive force T2 in the positive direction. Further, both of the first target drive force T1 and the second target drive force T2 may be set as negative values such that the first target drive force T1 is smaller than the second target drive force T2 in the negative direction (that is, greater in the positive direction). Further, in FIGS. 5 and 6, the first target drive force T1 is smaller than the second target drive force T2 such that both of the first target drive force T1 and the second target drive force T2 are set as negative values. However, the present invention is not limited to these examples. For instance, both of the first target drive force T1 and the second target drive force T2 may be set as positive values such that the first target drive force T1 is smaller than the second target drive force T2 in the positive direction the first target drive force T1 may be set as negative values such that the second target drive force T2 is set as positive values.

In FIGS. 3 to 6, the third target drive forces T3a and T3b have constant change rates. However, the present invention is not limited to these examples and the change rates may be increased or decreased in the process of changing drive force from the first target drive force T1 to the second target drive force T2. In other words, the change rate of the third target drive force T3a which is set after an cancel operation and the change rate of the third target drive force T3b which is set after a brake operation may be any rate as long as there is a difference in those change rates from the first target drive force T1 to the second target drive force T2. Note that the change rate of the target drive force is a change amount within a unit period of time.

The present invention is not limited to the aforementioned examples, and various modifications are possible without departing from the scope of the present invention. In the above description, the turn-off operation is performed on the cruise switch 29 as a cancel operation to stop the cruise system 27. However, the present invention is not limited to this. For instance, driver's shift lever operation, paddle shift operation and the like may be used as the cancel operation in a vehicle in which the cruise system 27 is stopped according to driver's speed changing operation. Further, in the above description, the camera unit 28 captures an image in front of the vehicle to obtain the preceding vehicle information. The camera unit 28 may be a stereo camera unit with a plurality of cameras or a monocular camera with a single camera. Further, the follow-up function may include a millimeter-wave radar, an infrared laser radar and the like to obtain travel information of the preceding vehicle. It is obvious that the camera unit 28, a millimeter-wave radar, an infrared laser radar and the like may be used in combination.

The invention claimed is:

1. A control device for a vehicle with a follow-up system to have the vehicle to travel as following a preceding vehicle, the control device comprising:
   a power source to transfer power to a drive wheel;
   a system stopper to switch the follow-up system from an active state to an inactive state based on at least one of a cancel operation and a brake operation by a driver;
   a first travel controller to set a first target drive force based on preceding vehicle information and control the power source based on the first target drive force when the follow-up system is in the active state;
   a second travel controller to set a second target drive force based on a driver's operation and control the power source based on the second target drive force when the follow-up system is in the inactive state; and
   a third travel controller to set a third target drive force that is a drive force variation in changing drive force from the first target drive force to the second target drive force and control the power source based on the third target drive force when the follow-up system is switched from the active state to the inactive state, wherein a change rate of the third target drive force which is set after the cancel operation by the third travel controller is different from a change rate of the third target drive force which is set after the brake operation by the third travel controller.

2. The control device for a vehicle according to claim 1, wherein
the first travel controller sets the first target drive force when the follow-up system is in the inactive state, and the second travel controller sets the second target drive force when the follow-up system is in the active state.

3. A control device for a vehicle with a follow-up system to have the vehicle to travel as following a preceding vehicle, the control device comprising:
a power source to transfer power to a drive wheel;
a system stopper to switch the follow-up system from an active state to an inactive state based on at least one of a cancel operation and a brake operation by a driver;
a first travel controller to set a first target drive force based on preceding vehicle information and control the power source based on the first target drive force when the follow-up system is in the active state;
a second travel controller to set a second target drive force based on a driver's operation and control the power source based on the second target drive force when the follow-up system is in the inactive state; and
a third travel controller to set a third target drive force that is a drive force variation in changing drive force from the first target drive force to the second target drive force and control the power source based on the third target drive force when the follow-up system is switched from the active state to the inactive state, wherein:
a change rate of the third target drive force which is set after the cancel operation by the third travel controller is different from a change rate of the third target drive force which is set after the brake operation by the third travel controller, and
when the follow-up system is switched to the inactive state under a condition that the first target drive force is greater than the second target drive force, the change rate of the third target drive force which is set after the brake operation is greater than the change rate of the third target drive force which is set after the cancel operation.

4. The control device for a vehicle according to claim 3, wherein
when the follow-up system is switched to the inactive state under a condition that the first target drive force is smaller than the second target drive force, the change rate of the third target drive force which is set after the brake operation is smaller than the change rate of the third target drive force which is set after the cancel operation.

5. The control device for a vehicle according to claim 4, wherein
the first travel controller sets the first target drive force when the follow-up system is in the inactive state, and the second travel controller sets the second target drive force when the follow-up system is in the active state.

6. The control device for a vehicle according to claim 3, wherein
the first travel controller sets the first target drive force when the follow-up system is in the inactive state, and the second travel controller sets the second target drive force when the follow-up system is in the active state.

7. A control device for a vehicle with a follow-up system to have the vehicle to travel as following a preceding vehicle, the control device comprising:
a power source to transfer power to a drive wheel;
a system stopper to switch the follow-up system from an active state to an inactive state based on at least one of a cancel operation and a brake operation by a driver;
a first travel controller to set a first target drive force based on preceding vehicle information and control the power source based on the first target drive force when the follow-up system is in the active state;
a second travel controller to set a second target drive force based on a driver's operation and control the power source based on the second target drive force when the follow-up system is in the inactive state; and
a third travel controller to set a third target drive force that is a drive force variation in changing drive force from the first target drive force to the second target drive force and control the power source based on the third target drive force when the follow-up system is switched from the active state to the inactive state, wherein:
a change rate of the third target drive force which is set after the cancel operation by the third travel controller is different from a change rate of the third target drive force which is set after the brake operation by the third travel controller, and
when the follow-up system is switched to the inactive state under a condition that the first target drive force is smaller than the second target drive force, the change rate of the third target drive force which is set after the brake operation is smaller than the change rate of the third target drive force which is set after the cancel operation.

8. The control device for a vehicle according to claim 7, wherein
the first travel controller sets the first target drive force when the follow-up system is in the inactive state, and the second travel controller sets the second target drive force when the follow-up system is in the active state.

* * * * *